E. Andrews,
Saw,
N° 85,417. Patented Dec. 29, 1868.
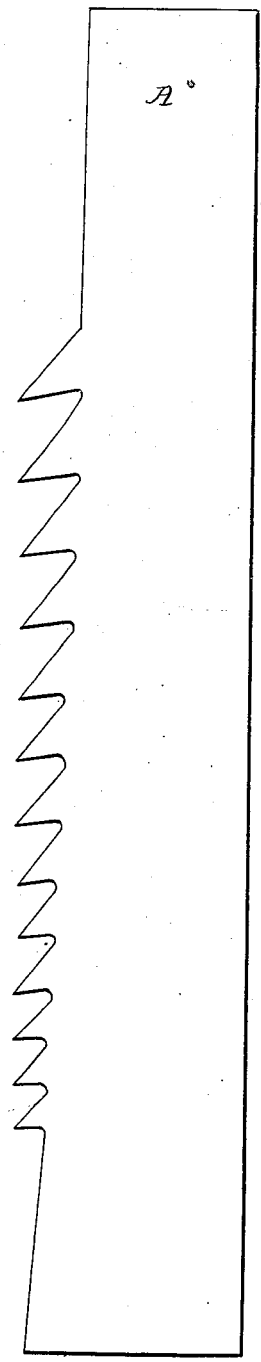
Witnesses.
N W Crouse
Joseph Andrews
Inventor.
Emanuel Andrews

EMANUEL ANDREWS, OF WILLIAMSPORT, PENNSYLVANIA.

Letters Patent No. 85,417, dated December 29, 1868.

IMPROVEMENT IN SAWS.

The Schedule referred to in these Letters Patent and making part of the same.

*To all whom it may concern:*

Be it known that I, EMANUEL ANDREWS, of Williamsport, in the county of Lycoming, in the State of Pennsylvania, have invented a new and useful Improvement in Reciprocating Muley, Gang, and Sash-Saws; and I do hereby declare that the following is a full and exact description thereof, reference being had to the accompanying drawing.

It is well known that up-and-down saws, with coarse teeth, will work easier and with less power than those with fine. The objection to the use of coarse teeth is, they make rough and ragged edges at the bottom of the cut, and the objections to the use of fine teeth are, they choke with sawdust in a deep cut, and consume more power.

The nature of my invention consists in producing a muley, gang, and sash-saw with fine teeth at the lower, and making it the widest end of the saw-plate, and gradually increasing the space and depth of the teeth as they proceed upwards, thereby adding strength to that part of a muley, gang, and sash-saw most requiring it, and lightness to the upper part, where it is desirable.

To enable others skilled in the art to make and use my invention, I will proceed to describe its construction and operation.

The accompanying drawing represents a muley-saw with my improvement.

It is therein readily seen that I make the lower teeth of a saw fine, gradually increasing the space between the teeth as they proceed towards the upper end.

When in operation the fine teeth commence the cut, and do not tear and rag the lower edge of the cut. Before the fine teeth are filled with sawdust, they are out of the cut, and the coarser teeth come into action at that part of the cut where most of the sawdust accumulates.

In the upward motion of reciprocating saws, power is accumulated, and the renewed power is applied, first, to the fine teeth in the downward-cutting stroke of the saw. As the saw proceeds down, exhausting the power, the coarser teeth are brought into action. These requiring less power to drive them, the saw is made to cut as easy at the upper end as it does at the lower end.

Fine teeth do not allow as much depth as coarse ones, consequently my saw-blade is left wider and heavier at the lower end than at the upper. Thus I gain stiffness at the part of the saw most requiring it, and lightness where it is wanted.

I am aware that whip and hand-saws have been made with graduated teeth, with the finest teeth beginning at the narrowest part of such saws; but my saw is of a different construction; I therefore do not broadly claim saws with graduateed teeth.

What I do claim, and desire to secure by Letters Patent, is—

The saw A, herein described, as an article of manufacture.

EMANUEL ANDREWS.

Witnesses:
N. W. CROUSE,
JOSEPH ANDREWS.